March 18, 1941.                F. KREIS                2,235,107
CENTRIFUGAL CLUTCH
Filed Jan. 18, 1940
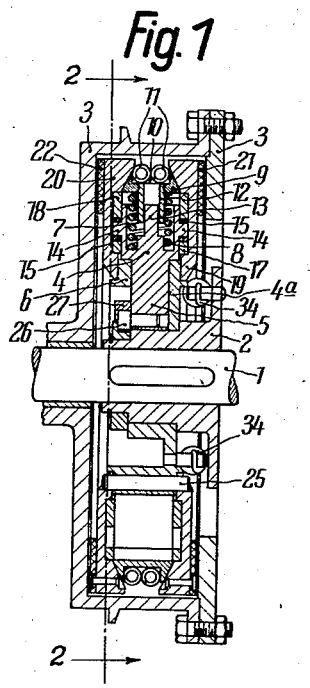
Fig. 1
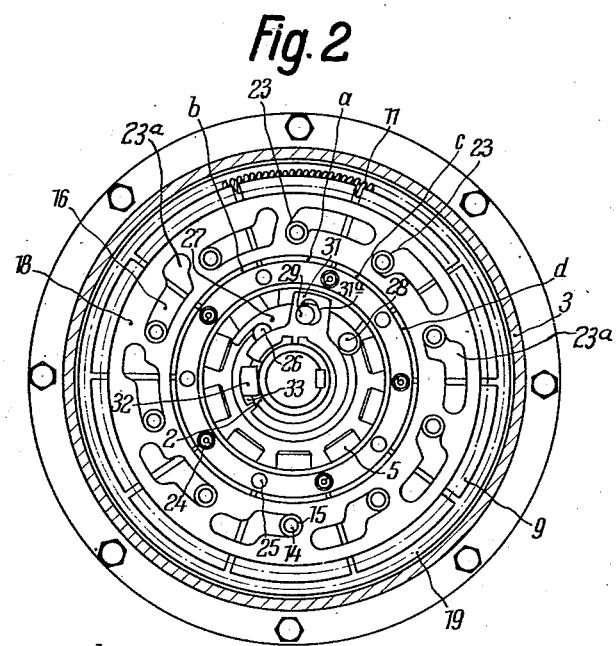
Fig. 2
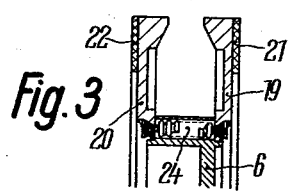
Fig. 3
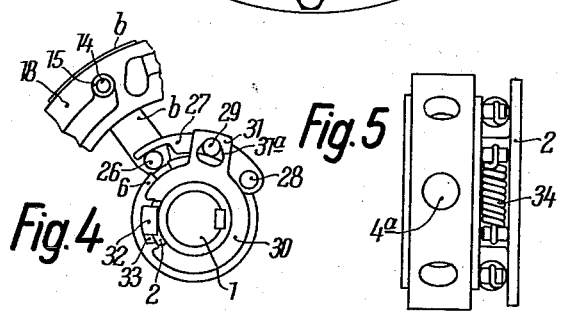
Fig. 4   Fig. 5
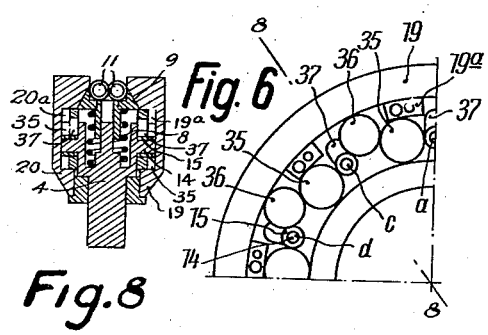
Fig. 6
Fig. 8
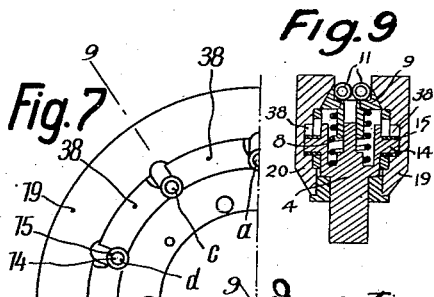
Fig. 7
Fig. 9
Inventor:
Friedrich Kreis,
By Porter, Pierce & Scheffler
Attorneys Patented Mar. 18, 1941

2,235,107

UNITED STATES PATENT OFFICE 2,235,107

CENTRIFUGAL CLUTCH

Friedrich Kreis, Berlin-Lichterfelde, Germany, assignor to Gesellschaft zur Konstruktion und Verwertung Automatisch-Mechanischer Getriebe m. b. H., Berlin-Oberschoneweide, Germany Application January 18, 1940, Serial No. 314,535
In Germany January 3, 1939

12 Claims. (Cl. 192—105)

The present invention relates to improvements in centrifugal clutches.

Prior types of centrifugal clutches for motor vehicles, in which centrifugal force is relied upon to produce the gripping pressure between the driving and driven parts, and in which the required gripping pressure is produced gradually with increase in the number of revolutions of the driven member, have the disadvantage that the clutch surfaces have comparatively long slipping periods, resulting in rapid wear. In types wherein the centrifugal weights are locked against movement up to a certain number of revolutions so that upon releasing the lock the entire gripping pressure is produced suddenly, the engagement of the clutch is jerky. Even in centrifugal clutches in which centrifugal forces are used only for controlling the gripping pressure, similar faults have been present to a greater or lesser extent.

The present invention has as its primary object the elimination of the drawbacks of centrifugal clutches mentioned above. An object of the invention is to provide a centrifugal clutch of improved construction in which the engaging members operated by centrifugal weights are caused to engage or disengage in succession in point of time without change of the number of revolutions. This object is accomplished by provision of means whereby only one selected centrifugal weight can follow the centrifugal movement unhindered, the movement of each of the following weights being blocked until the first weight has moved and then each of them being released in succession as the next preceding weight finishes its movement or a part of its movement.

The invention will be described more in detail in connection with the accompanying drawing which illustrates preferred embodiments thereof.

In the drawing, wherein preferred constructional examples are shown by way of illustration.

Fig. 1 is an axial section through a centrifugal clutch embodying the invention, Fig. 2 is a sectional view on the line 2—2 of Fig. 1 with part 20 removed, Fig. 3 is a fragmentary axial section with some parts omitted, Fig. 4 is a fragmentary section on the same line as Fig. 2 but with some parts omitted for the sake of clearness, Fig. 5 is a side elevation of some of the parts, Fig. 6 is a fragmentary radial section through a modified embodiment of the invention, Fig. 7 is a similar view illustrating a further modification, Fig. 8 is a partial section on the line 8—8 of Fig. 6, and Fig. 9 is a partial section on the line 9—9 of Fig. 7.

Referring more particularly to the form of the invention shown in Figs. 1 to 5, the numeral 1 indicates the driving shaft which has the driving clutch part or hub 2, which is the inner member, rigidly mounted thereon, while the outer driven clutch part in the nature of a drum 3 is journalled on the shaft 1. The centrifugal weights 4, in the present embodiment constituting ten sectors of a weight ring, are formed with pin-like inner ends 5 slidably seated in suitable recesses 4a of a carrier drum 6 which is connected to the driving clutch part 2. The ends 5 have a sliding fit in the recesses 4a so that the weights 4 are free to move radially in and out during operation of the clutch. In their outer ends the weights 4 each have an annular recess 7 into which a compression spring 8 is inserted. At the outside, each of the springs 8 rests against a wedge weight 9. The wedge weights are likewise sectors arranged in the form of a ring like the centrifugal weight 4. In common, they carry two constricting springs 11 in annular grooves 10 and are mounted so as to slide radially on pins 13 upstanding in the recesses 7 of the appertaining centrifugal weight 4 by means of a sleeve 12 carried by each which latter have a sliding fit over the respective pins 13. The weights 4 also each have a pin-like projection 14 at opposite sides thereof on which bearing sleeves 15 are arranged to turn. These pins 14 with sleeves 15 extend into slot-like cut-outs 16 (Fig. 2) of control rings 17 and 18 disposed on opposite sides of the ring of weights. The control rings 17 and 18 are seated in annular recesses in the inner faces of the axially movable clutch plates 19 and 20 respectively, being free to turn relative to the plates. The clutch plates, which are movable axially in opposite directions to engage adjacent faces of the driven clutch part 3, are provided with friction facings 21 and 22, respectively.

The slot-like cut-outs 16 in the control rings 17 and 18 are so made that the two adjacent weights $a$ and $b$ constituting the first and last of the series initiate the engaging and disengaging of the clutch. Specifically weight $a$, initiates the engaging, and weight $b$, the disengaging.

Before the clutch is engaged, all the weights except weight $a$ are blocked from radial movement under centrifugal force by the engagement of the pins 14 in the locking ends of the slot cutouts 16 of the control rings 17 and 18 as seen in Fig. 2. Until the shaft 1 attains the desired speed the first weight a is likewise held in by the compression spring 8. The compression spring 8 associated with weight a is stronger than those for all the other weights.

When the number of revolutions of shaft 1 has increased so much that the wedge weights 9 overcome the pressure of the two constricting springs 11, then the two clutch plates 19 and 20 and with them the surfaces 21 and 22 are oppositely moved in the direction of the axis because of the wedging effect of the weights 9. At the same moment, the weight a can follow the wedge 9 due to the release of tension from the spring 8. As the weight a moves radially outward, the control rings 17 and 18 are turned forcibly a few degrees, this shifting being effected by the pins 14 as they ride outwardly bearing against the inclined face 23 of the lateral slot 23a at the end of slot 16. This initial turning movement of the rings 17 and 18 out of full locking position under the influence of the first weight a is sufficient to liberate the second weight c of the series by reason of movement of the pins 14 from the locking end of the slot 16 of the control ring to a position opposite the lateral branch permitting movement radially towards the outside against the cam surface 23. In this way, the control rings 17, 18 are again turned a little and the succeeding weight d is liberated, the same action being repeated for each succeeding weight up to the last weight b.

In this connection it is noted that in each succeeding slot, the lateral branch is a little further removed from the locking end thereof. In this way, it becomes possible for the required gripping pressure to be produced over a period equal to ten times, (there being ten weights in the clutch shown), the time that it would take if all the weights were thrown out at once. For obtaining this tenfold shifting period moreover it is not necessary to increase the number of revolutions beyond the speed necessary to operate the initial weight a. The lengthened operating time however causes a smoother engagement so that jerky throwing in of the clutch is avoided.

When the clutch is engaged, all the weights 4 with the exception of the last weight b are hindered from movement inward by the form of the slots 16 of the two control rings 17, 18, i. e. hindered from disengaging the clutch. The weight b, which is the initiating weight when disengaging, has a lighter compression spring 8 than any of the other weights 4 so that this weight tends to remain longer in the engaged position under influence of centrifugal force. In this way it is made possible in a simple manner to cause the disengaging of the clutch to begin at a much lower number of revolutions than the engagement. Only when the centrifugal force of the weight b with decreasing number of revolutions has dropped off so far that the spring force of the comparatively weak compression spring 8 thereof overcomes the centrifugal force of this weight is the weight b pressed down towards the inside and the control rings 17 and 18 operated in the reverse of the path laid down in the engagement of the weights. The disengaging of the different weights 4 takes place exactly in succession, just as in the engagement, but in reverse sequence. This is assured since all the other springs 8 for the weights following the weight b in the disengaging direction are stronger and thereby in these weights there is already the tendency to disengage earlier than the weight b, this being prevented only by the locking effect of the slots 16 up to a definite turning of the control rings 17 and 18.

The adjustment of the springs 8 of the weights a and b determine at what number of revolutions the engagement and disengagement of the clutch is to occur. The wedge weights 9 follow the pressure of the constricting springs 11 inwards again and the two clutch plates 19 and 20 are drawn together by means of retaining springs 24 (Fig. 3) when the clutch disengages.

The clutch plates 19 and 20 are in driving connection with the shaft 1 through the carrier drum 6 and the connecting bolts or pins 25. The clutch plates are mounted on the latter so as to be able to slide in the direction of the axis. With this arrangement, it is possible to positively disengage the clutch earlier with increased loading moment than would otherwise occur. In order to accomplish this, the weight b (Fig. 4) has a projecting pin 26 on which the free end of a pivoted pawl arm 27 rests, the arm being mounted to pivot on the bolt 28. A laterally projecting pin 29 is rigidly carried on the side of the pawl arm 27. A compression ring 30 is constructed so that it engages the pin 29 located on the pawl 27 by means of a lug 31 having a slot-like recess 31a. The dog drum 6 is joined to the hub 2 through three wedges 32. The wedges however still permit a slight turning of the drum 6 on the hub 2, the permitted amount of turning being shown at 33. This turning however can occur only when the moment arising in shaft 1 or hub 2 is so great that the force of the tension springs 34 that are inserted between hub 2 and drum 6 is overcome. The springs 34 can be set to a definite moment. If then upon very strong loading moment a turning of the hub 2 and drum 6 in relation to each other occurs, then, through hub 2, ring 30 and lug 31, the bolt 29 and thereby the pawl 27 are forced inward due to the shape of recess 31a, and at the same time, through bolt 26, the weight b is likewise drawn inwards. Since all the other weights at this moment already have the tendency to disengage, a disengagement of all the weights in direct succession and thereby a releasing of the clutch will occur at once after the initial turning of the control rings 17 and 18 induced by inward movement of weight b.

In the modified form of the invention shown in Fig. 6 the general form of the clutch is the same as described above except that the control rings 17 and 18 are replaced by a series of simple circular plates or disc-like members 35 and 36. The plates 35 and 36 are in pairs disposed between the pins 14 of adjacent weights and are seated in the annular recesses in the inner faces of the clutch plates 19 and 20. The plates 35 of each pair are set at one edge against the pins 14 of one weight and are confined against radial movement by stops 19a which with the inner wall of the annular recesses form a guide or track permitting movement of said plates in an annular path only. The plates 36 rest at one side against pins 14 of the next adjacent weight, contacting also the outer wall of the recess in the clutch plates and the plate 35 in such a way that when all weights are retracted to clutch disengaging position, the plates 36 are held in position against pins 14 so as to prevent outward movement of the weights. The weights are held against annular or lateral movement by radial guiding slots 37 through which the pins 14 project. With this construction outward movement of the weight $a$, guided in the radial slot 37, frees the plate 35 associated therewith and thereby permits shifting of it and the plate 36 likewise to release the pins 14 of weight $c$, so that then weight $c$ can likewise move radially outward. The outward movement of weight $c$ releases the next following pair of plates 35 and 36 so that then weight $d$ can follow and so on in succession until the entire series is released as described. In the engaged condition of the weights, the plates 35, 36 all are located underneath or inwardly of the pins 14 with bushings 15 of all the weights so that the weights are locked in clutch engaging position until the sequence is reversed.

Instead of plates 35, 36, small arcuate plates 38 could likewise be used as seen in Fig. 7. The method of operation here is the same in principle as in the afore-described constructional example. The arcuate plates are stepped at each end for cooperation with the pins 14 so as to lock the same in position until the plates, in succession are shifted annularly to release the weights.

In each case, a smooth clutch action is produced by the successive engagement of the different weights. In addition a satisfactory engaging and disengaging of the clutch is assured without the weights sliding for an unduly long time since the successive engagement and disengagement of the weights occurs without the necessity of change in the number of revolutions after the first weight has described its path of movement and initiated the cycle. In all cases, moreover, the period of engagement can be changed in relation to the period of disengagement. With each constructional form moreover an earlier disengagement can be executed upon increased loading moment.

While preferred embodiments of the invention have been shown and described by way of illustration, it will be understood that various other modifications and variations in the details of construction may be resorted to without departing from the spirit of the invention within the scope of the appended claims.

I claim:

1. In a centrifugal clutch, a series of centrifugal weights movable between engaging and disengaging positions for effecting engagement and disengagement of said clutch, means for locking all of said weights except one in one of said positions against free movement toward the other of said positions, said means being operable upon movement of the unlocked weight toward one of said positions for releasing the next succeeding weight in the series and operable by movement of the so released weight to release the next succeeding weight, whereby each weight following the first in series is held against movement until the preceding weight has moved from one locked position toward the other position.

2. In a centrifugal clutch, a series of centrifugal weights movable between engaging and disengaging positions for effecting engagement and disengagement of said clutch, means for locking all of said weights except one in one of said positions against free movement toward the other of said positions, said means being operable upon movement of the unlocked weight toward one of said positions for releasing the next succeeding weight in the series and operable by movement of the so released weight to release the next succeeding weight, whereby each weight following the first in series is held against movement until the preceding weight has moved from one locked position toward the other position and spring means associated with each of said weights for biasing the latter to one of said positions against centrifugal force, the tension of said springs being such that the moment when the first weight in the series is constrained to move from one position to the other the remaining weights already have the tendency to move in the same sense.

3. In a centrifugal clutch, a series of centrifugal weights movable between engaging and disengaging positions for effecting engagement and disengagement of said clutch, means for locking all of said weights except one in one of said positions against free movement toward the other of said positions, said means being operable upon movement of the unlocked weight toward one of said positions for releasing the next succeeding weight in the series and operable by movement of the so released weight to release the net succeeding weight, thereby each weight following the first in series is held against movement until the preceding weight has moved from one locked position toward the other position and spring means associated with each of said weights for biasing the latter to one of said positions against centrifugal force, the tension of said springs being such that at the moment when the first weight in the series is constrained to move from one position to the other the remaining weights already have the tendency to move in the same sense, the spring means associated with the first weight in the series in the direction of disengagement being weaker than the remainder of said spring means whereby disengagement of said clutch occurs at a lesser number of revolutions than the engagement thereof.

4. In a centrifugal clutch, a series of centrifugal weights movable between clutch engaging and disengaging positions for effecting engagement and disengagement of said clutch, movable means actuated by said weights for locking each of said weights save one in one of said positions, said movable means being shifted by movement of said last mentioned weight from one of said positions toward the other to release the next succeeding weight in series and being shifted by the so released weight to release the next succeeding weight.

5. In a centrifugal clutch, a series of centrifugal weights movable between clutch engaging and disengaging positions for effecting engagement and disengagement of said clutch, a shiftable locking ring associated with said centrifugal weights, connections between said locking ring and each of said weights operable to lock each of said weights save one in one of said positions and to shift said ring to release said weights in succession, the unlocked weight acting to initiate shifting of said ring upon movement of said weight from one position toward the other to release the next succeeding weight and each of said weights as released acting to shift said ring to release a succeeding weight.

6. A centrifugal clutch according to claim 5 in which said ring is provided with a series of slots formed to provide cam surfaces and said weights have bearing pins engaging in said slots said bearing pins arranged to engage said cam surfaces to effect the said shifting movement of said ring as the respective weights move from one position to the other.

7. A centrifugal clutch according to claim 5 in which the connections between said weights and said shiftable locking ring comprise a series of slots formed in said ring, said slots having offset ends connected by a slanting channel providing cam surfaces and bearing pins carried by said weights and engaged in said slots, whereby passage of said pins through said slanting channel upon movement of the associated weights from one position to the other causes shifting of said ring by reason of engagement of said bearing pins with said cam surfaces.

8. In a centrifugal clutch including cooperating clutching elements movable into and out of gripping relation, a series of centrifugal weights adapted to effect movement of said clutching elements into and out of gripping relation, and means under control of said centrifugal weights for retaining all of said weights following the first in the series against movement until the latter has moved toward clutch engaging or disengaging position and for thereafter releasing each of said weights in succession.

9. A centrifugal clutch according to claim 1, in which means are provided for guiding said weights in radial paths, and said locking means includes lateral projections on said weights and locking plates between and engaging said projections, said locking plates being formed and disposed whereby movement of one of said weights from one position toward the other releases the locking plates between it and the next succeeding weight, thereby releasing the latter.

10. A centrifugal clutch according to claim 1 in which means are provided for guiding said weights in radial paths, and said locking means includes lateral projections on said weights and locking plates between and engaging said projections, said locking plates being formed and disposed whereby movement of one of said weights from one position toward the other releases the locking plates between it and the next succeeding weight, thereby releasing the latter, the movement of each weight shifting said plates in advance thereof to a position to lock the preceding weight in its new position.

11. In a centrifugal clutch according to claim 1, torque responsive means for positively moving the first weight of the series in the direction of disengagement whereby to initiate the successive retraction of said weights to disengaging position.

12. A centrifugal clutch according to claim 1 in which said weights are carried by a carrier drum having a torque responsive yielding connection with a driving hub member to provide for relative turning movement between said carrier drum and hub upon application of an excessive torque to said clutch, and pawl and lever means associated with the weight constituting the first in the series in the direction of disengagement for positively retracting said weight to initiate the successive retraction of said weights upon application of an excessive torque to said clutch.

FRIEDRICH KREIS.

CERTIFICATE OF CORRECTION.

Patent No. 2,235,107. March 18, 1941.

FRIEDRICH KREIS.

It is hereby certified that error appears in the printed specification of the above numbered patent requiring correction as follows: Page 3, second column, lines 23 and 24, for "net succeeding weight, thereby" read --next succeeding weight, whereby--; and that the said Letters Patent should be read with this correction therein that the same may conform to the record of the case in the Patent Office.

Signed and sealed this 8th day of April, A. D. 1941.

(Seal)

Henry Van Arsdale,
Acting Commissioner of Patents.